United States Patent [19]
Page

[11] Patent Number: 5,199,877
[45] Date of Patent: Apr. 6, 1993

[54] PHYSIOLOGICAL DEMONSTRATION UNIT

[76] Inventor: W. Randolph Page, 1215 Pine St., New Orleans, La. 70115

[21] Appl. No.: 715,499

[22] Filed: Jun. 14, 1991

[51] Int. Cl.$^5$ .............................................. G09B 23/00
[52] U.S. Cl. ................................ 434/262; 128/660.02; 434/270
[58] Field of Search ............... 434/262, 268, 270, 272; 128/630, 660.02, 731, 748, 674, 675

[56] References Cited

U.S. PATENT DOCUMENTS

| | | | |
|---|---|---|---|
| 3,802,096 | 4/1974 | Matern | 434/270 |
| 4,003,141 | 6/1977 | LeRoy. | |
| 4,033,141 | 7/1977 | Gustafsson. | |
| 4,984,567 | 1/1991 | Kageyama et al. | 128/660.02 |

OTHER PUBLICATIONS

Page, W. R., "Pulse Amplitude Control with Human Brain Tumor in Man & Analog", 1982, IEEE Frontiers of Engineering in Health Care, pp. 575–579.
Page, W. R., "Brain Compression Damage Tests", 1986, 39th An. Conf. on Engineering Medicine & Biology, p. 383.

*Primary Examiner*—Richard J. Apley
*Assistant Examiner*—Glenn E. Richman
*Attorney, Agent, or Firm*—C. Emmett Pugh

[57] ABSTRACT

A "heart" unit serving as a partial analog system of the human body for demonstrating physiological events which occur during the growth of a brain tumor, including cardiac and respiratory failure during rapid tumor growth, for teaching purposes and the like, including an analog of the heart with fluid pumping means for inducing a pulsing flow; an analog of the respiratory muscles with means for inducing a secondary pressure pulse; an analog of the circulatory system including circulating fluid upon which said analog heart induces a pulsing flow and said respiratory muscles induce a pressure oscillation; an analog of the cranial cavity; an analog of a brain tumor with supplemental means for displacing a portion of the intracranial cavity; and an analog of the cerebral fluid within analog ventricles with means to flow in and out of the cranial cavity via analog subarachnoid paths to equalize cerebral pressure with the circulatory system pressure outside of the cranial cavity. The analog device includes fluid amplifiers using a confined stream of liquid. A simplified model of the system can be viewed as a rigid closed container, the volume of which is completely filled by many sacs filled with incompressible fluid, one sac being vented to atmosphere and another being connected to a fluid injection system. The injection of more incompressible fluid into any sac causes the fluid being displaced from the sac to be vented to atmosphere, thus maintaining volume equilibrium.

17 Claims, 3 Drawing Sheets

PHYSIOLOGICAL DEMONSTRATION UNIT

BACKGROUND OF INVENTION

1. Field of Invention

The present invention relates to medical teaching aids, and more particularly to those which demonstrate the physiological effects of brain tumor growth in an analog fashion.

This invention further relates to fluid amplifiers and more particularly to fluid amplifiers using a confined stream of liquid.

2. Prior Art & General Background

Fluid amplifiers using jets of gas whose flow is confined in channels and controlled by other jets are well known. Also known are various types of plethysmographies used in physiological investigations of blood circulation.

In particular, an instrument with continuous but not circulating flow into a chamber containing a gas bubble or which varies the volume by lifting the outer, upper wall is generally known as a "windkessel". In effect, it is a surge chamber.

At present, it is the main way to evaluate circulation pulse physically. Certain models are also used in representing intracranial pressure and in testing devices for measuring intracranial pressure. Such a device is shown in Le Roy's U.S. Pat. No. 4,033,141, which discloses a confined volume filled with a porous medium and containing inflatable sacs for adjusting the intracranial pressure. Since such devices make no provision for a circulating medium, they do not provide even a primitive model of the vertebrate intracranial circulation.

A list of prior patents and publications which may be of interest is presented below:

| Patent No. | Patentee(s) | Issue Date | |
|---|---|---|---|
| 4,033,141 | LeRoy | 01/18/77 | |
| 4,033,141 | Gustafsson | 07/05/77 | |

| Publication Title | Author(s) | Publication | Date |
|---|---|---|---|
| "Pulse Amplitude Control with Human Brain Tumor in Man & Analog" | Page, W. R. | IEEE Frontiers of Engineering in Health Care (pp. 575-579) | 1982 |
| "Brain Compression Damage Tests" | Page, W. R. | 39th An. Conf. on Engineering Medicine & Biology (p. 383) | 1986 |

3. General, Summary Discussion of the Invention

Detail is included in the exemplary embodiment of the demonstration analog unit of the invention described below, which permits adjustment to include a vide variety of intracranial conditions observed clinically. It is a lumped representation of all the basic properties of vertebrate cranial circulation.

A simplified model of the system can be viewed as a rigid closed container, the volume of which is completely filled by many sacs filled with incompressible fluid, one sac being vented to atmosphere and another being connected to a fluid injection system.

The injection of more incompressible fluid into any sac causes fluid to be displaced from the sac and vented to atmosphere, thus maintaining volume equilibrium. This same action is observed in vertebrates cranial circulation and is the basis of the fluid amplifier unit disclosed.

Although this present invention is described in terms of a preferred embodiment of a medical teaching aid, it should be understood that additional uses of the unit are within the scope of the invention as determined by the claims. For a more complete description of the preferred embodiment of the system of the invention, reference should now be made to the following detailed specification and the accompanying drawing.

Alternate approach or modifications are also considered below.

BRIEF DESCRIPTION of the DRAWINGS

For a further understanding of the nature and objects of the present invention, reference should be had to the following detailed description, taken in conjunction with the accompanying drawings, wherein.

DETAILED DESCRIPTION of the PREFERRED, EXEMPLARY EMBODIMENT

Figure 1A:
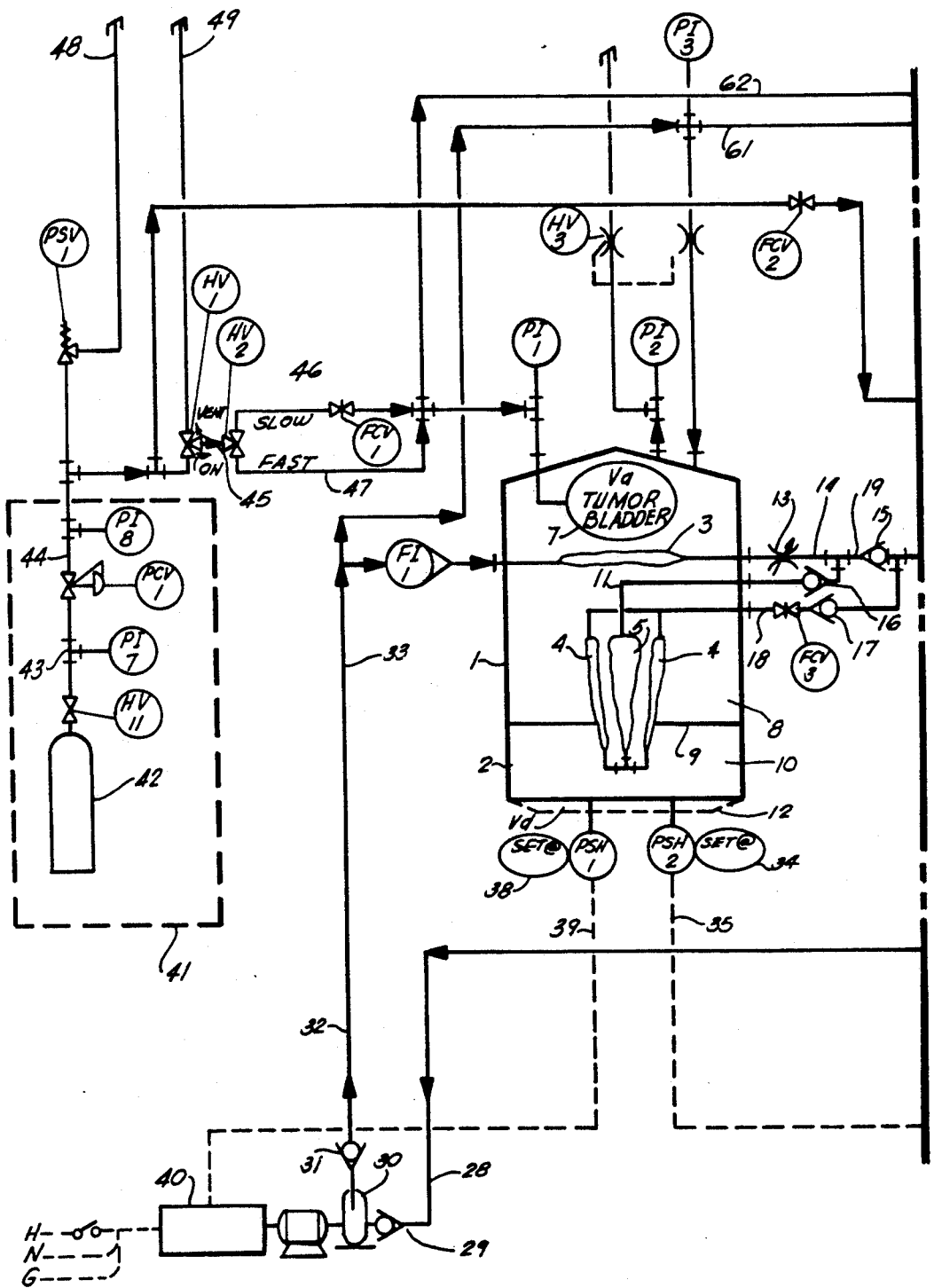
FIGS. 1a and 1b in combination are a mechanical flow chart illustration of an exemplary, preferred embodiment of the physiological demonstration or analog unit of the present invention, which illustration uses the adapted symbology of the Instrument Society of America (ISA) to indicate the operational configuration of the unit.
Figure 1B:
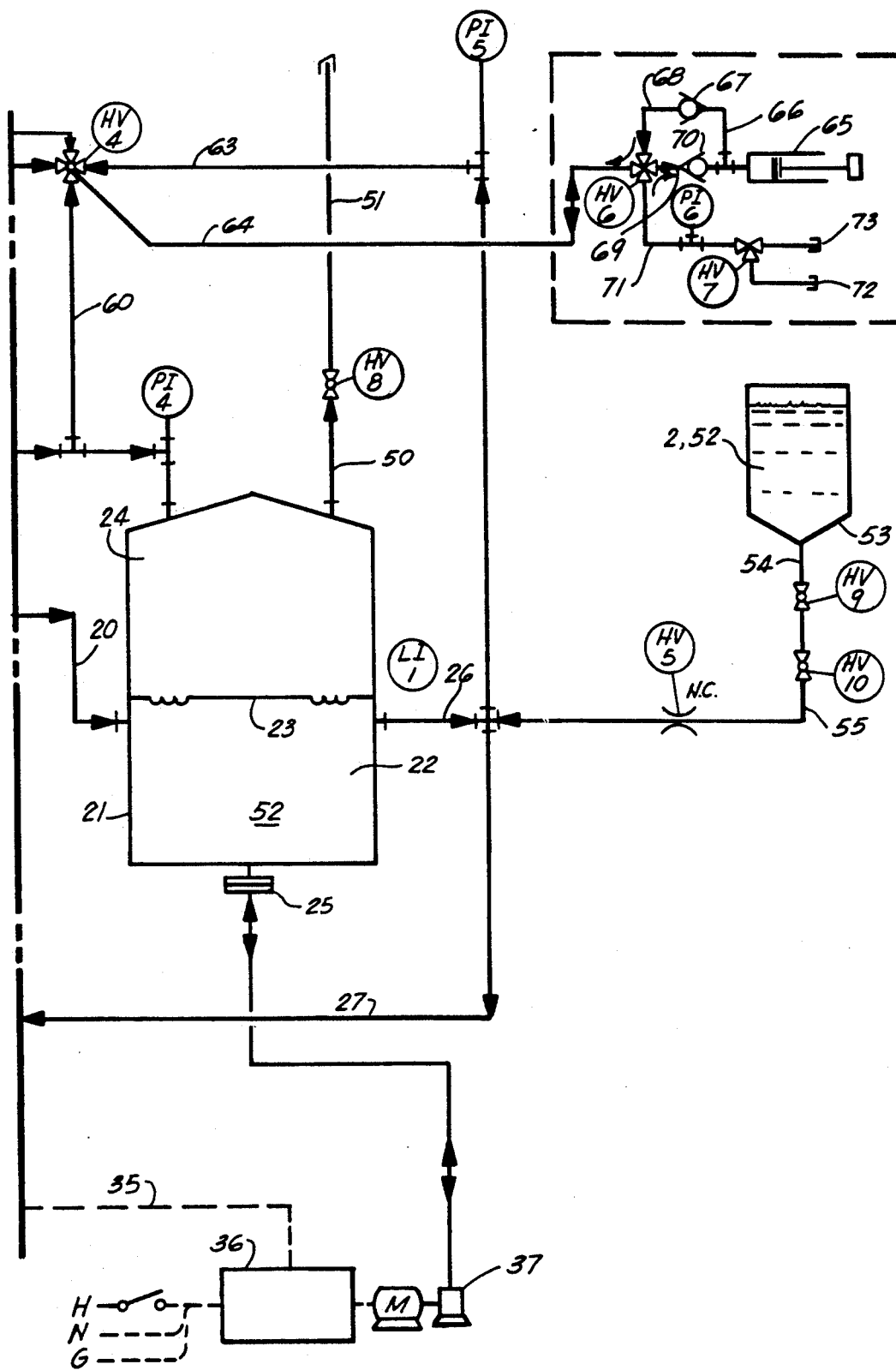

As can be seen in FIG. 1A, 1B the unit has a static fluid 2 within the "cranial cavity" 1. The static fluid 2 takes up fixed volumes "Vs1" 8 and "Vs2" 10. "Vs1" is the volume of the static fluid above the diaphragm 9, while "Vs2" is the volume of the static fluid below the diaphragm 9.

The unit has a circulatory system which can be simplified by being divided into two systems, a major system and a subsystem. The major system conveys circulating fluid to the analog "thoracic and cranial cavity," while the secondary system maintains pressure equilibrium between the "intracranial cavity" analog and the "venous system" analog. The major circulatory system will be described first followed by the minor circulatory system.

The major circulatory system's main components include a pump 30, which is the analog "heart," inducing a pulsing flow on the circulating fluid 52. The circulating fluid 52 enters the suction side of pump 30 through line 27 and is discharged into line 32.

The induced pulse is indicated by a pressure gauge PI-3. The flow of the circulating fluid 52 and its pulse are also indicated as it flows through an indicating flowmeter FI-1.

The circulating fluid 52 then enters chamber 1, which is the analog "cranial cavity." The circulating fluid 52 flows through the cranial cavity by line 3, which is the analog "cranial arterial system." Line 3 can be seen to pulsate during operation.

The fluid 52 then passes through a variable orifice/filter 13, which is the analog "capillary system of brain tissue," through check valve 15, which serves at the analog "sagittal sinus veno-venous valve," before entering line 19, which is the analog distal "cranial venous system." The fluid then flows to chamber 21, which is the analog "thoracic cavity central venous pools."

The fluid then flows back to line 27 where it returns to the "heart" 30.

The secondary circulatory system maintains equilibrium between the pressure of the cranial cavity 1 and the pressure of the venous system 19.

During the growth of the "tumor" 7, the volume of the tumor (Va) increases within the cranial cavity 1. Intracranial pressure, as indicated by a pressure indicator PI-2, rises above the reference or sink venous pressure, as indicated by pressure (PVO) indicator PI-4. This pressure imbalance forces the circulating fluid 52 out of the ventricle 5 through the "subarachnoid paths" 4 into line 18 through FCV-3, then through check valve 17, which is the "lumped sagittal sinus" analog, and into the "distal cranial venous system" line 20.

This flow occurs until either:

(1) pressure is equalized between the intracranial venous system 19, inside of the cranial cavity 1, as indicated by PI-2; or (2) until the circulating fluid 52 within the ventricle 5 and the subarachnoid paths 4 has drained completely into the central venous system 22.

The pressure is equalized when the change of fluid bleed volume is equal to the volume of the tumor (Va). If however, the initial volume of fluid within the ventricles 5 and the subarachnoid paths 4 (Vp2) is less than the final tumor volume (Va), or when the rate of tumor growth (dVa/dt) is greater than the rate of fluid flow from the ventricles and subarachnoid paths (dVp2/dt, adjusted by FCV-3) into the venous system 20, the cranial pressure rises and a portion of the volume of static fluid (Vs1) within the upper cranial cavity 8 flows through the diaphragm 9 simulating the "tentorial hiatus," into the lower cranial cavity 10, thus distending the lower cranial cavity 10 and increasing the lower cranial cavity by a volume "Vd", simulating "brain stem strain."

Distension of the simulated cranial cavity 12 is an indication that the fluid volume within the cranial cavity "V" is too great and the secondary circulation cannot maintain equilibrium. Actual distension of the cranial cavity itself does not occur but the effect is similar to "dynamic brain stem shift moving tissue out of the cranial cavity."

If distension 12 continues ("Vd" continues to increase) until the setpoint 34 of limit switch PSH-2 is reached, then the limit switch will activate, which interrupts the electric circuit 35 supplying power to the analog respiratory pump 37, thus causing the pump 37 to stop.

If the pressure within the cranial cavity continues to increase, the cranial cavity 1 continues to distend. If distension continues to the setpoint 38 of limit switch PSH-1, the limit switch will activate, which interrupts the electric circuit 39 supplying power to the analog cardiac pump 30 thus causing the pump 30 to stop.

During tumor shrinkage, as previously described, pressure within the cranial cavity (1), as indicated by PI-2 decreases, which reverses the described distension 12 of the cranial cavity 1. If distension 12 reverses until the setpoint 38 of limit switch PSH-1 is reached, PSH I is deactivated. This closes the electric circuit 39 supplying power to the cardiac pump 30, causing the pump 30 to restart. If distension 12 continues to reverse to the setpoint 34 of the limit switch PSH-2, PSH-2 is deactivated, which then closes the electric circuit 35 supplying power to the respiratory pump 37, causing the pump 37 to restart.

During tumor (7) elimination (Va goes to zero), the venous pressure (PV), the intracranial pressure (as indicated by PI-2) drops below the venous pressure, which causes the circulating fluid 52 to flow from the venous system (line 14) to the check valve 16 through line 11, filling both the ventricle (5) and subarachnoid paths 4 restoring their volumes to "Vp2", while eliminating the volume "Vd" caused by distension of the lower cranial cavity.

Pressurized air 42 used to modify the displacement of the tumor 7 is stored in supply tank 42. The explanation of air flow to increase the size of the tumor 7 is as follows.

Shutoff valve HV-11 is opened to allow air to flow out of the storage tank 42 into line 43, where pressure indicator PI-7 monitors the pressure in line 43. Pressure control valve PCV-1 is then adjusted such that air flows into line 44, thus elevating the pressure within line 44.

The regulator PCV-1 must be adjusted such that the pressure in line 44 (indicated by pressure indicator PI-8) is higher than the intracranial pressure PI-2. The three-way valve HV-1 must be positioned such that air flows from line 44 to line 45.

If the simulation of a relatively slow rate of tumor growth is desired, the three-way valve HV-2 is positioned such that air flow is from line 45 to line 46. The flow rate of air from line 46 into line 47 and then into the tumor 7 is adjusted using FCV-1.

However, if the simulation of fast tumor (7) growth is desired, valve HV-2 is positioned such that the flow is from line 45 to line 47 and into the tumor 7. In either position of the valve HV-2, the tumor (7) pressure is indicated by pressure indicator PI-1.

The method for decreasing the size of tumor 7 is as follows.

Three-way valve HV-1 must be positioned such that air can flow from line 45 to line 49. For rapid displacement decrease, the three-way valve HV-2 must be positioned such that air can flow from line 47 to line 45. For slow decreasing of displacement of tumor 7, the three-way valve HV-2 must be positioned such that air flow is from line 46 to line 45. During slow displacement changes of the tumor 7, the rate can be finely adjusted by adjusting flow control valve FCV-1.

The tumor 7 inflation system is equipped with a pressure relief valve PSV-1, which prevents over-pressuring the tumor inflation circuit. If line 44 experiences pressure higher than the relief setting of PSV 1, air is expelled through PSV-1 to line 48, which then vents to atmosphere.

The unit is equipped with a recorder pressure port 73 and means of selecting one of four internal pressures to be recorded at pressure port 73. The pressures which can be selected for recording are venous fluid pressure PV (as indicated by PI-5), tumor bladder (7) pressure (as indicated by PI-1), arterial fluid pressure 3 (as indicated by PI-3), and "PVO" in gas over-pressure 24 (as indicated by PI-4).

Selection of the respective pressure to be recorded is made by positioning HV-4 such that line 64 is opened to one of the lines 63, 62, 61 or 60, which transmit venous pressure, tumor bladder pressure 7, intracranial cavity pressure, and "PVO" overpressure pressures, respectively. Any selection pressurizes the line 64 with the selected pressure to be recorded.

The next step in recording one of the aforementioned pressures is to position valve HV-6 to allow flow between line 64 and line 71. The last step is to position three-way valve HV-7 such that flow is between line 71 and recorder port 73, which would be connected to the continuous recording device.

The recording system is equipped with a scavenging pump 65, which takes fluid remaining in line 71 after the recording sequence (as described above) and puts it back into the circulatory system. This is done by positioning valve HV-6 such that the flow is between lines 71 and 69 and between lines 68 and 64, and also positioning valve HV-7 such that air is permitted to flow from vent 72 to line 71.

When the reciprocating manual pump 65 is on the intake stroke, the fluid in line 71 flows through valve HV-6 into line 69 through check valve 70 and into the chamber of the manual pump 65. During the discharge stroke of manual pump 65, the fluid within the chamber of manual pump 65 is then discharged into line 66 through check valve 67 into line 68 and then passes through HV-6 into line 64 through HV-4 and back into one of lines 63, 62, 61 or 60, into whichever valve HV-4 is positioned to discharge.

The unit is equipped with a fluid fill system in which circulating fluid 52 can be introduced into the circulatory system, and static fluid can be introduced or installed into the spaces of the cranial cavity 1.

The fluid which will become static fluid 2 and circulating fluid 52 is contained in fill receiver 53. The fill reservoir fluid 52, 2 is gravity fed into line 54 through valves HV-9/10 into line 55 through valve HV-5 and into line 27. Fill fluid 2, 52 is then pumped through line 32/33, where it branches into line 56 and through the flowmeter FI-1.

The fluid, which flows into line 56 through the opened pinch valve HV-3 into line 56 and finally into the cranial cavity 1, becomes static fluid within the cranial cavity 1. The fluid which flows through FI-1 into the cranial cavity 1 via the arterial path 3, then through variable orifice/filter 13 into line 19 to line 20, and into the central venous pools 22 in the lower portion of thoracic cavity 21, becomes circulating fluid 52.

Air bubbles initially within the circulatory system as described above then are trapped as a large bubble below the elastic diaphragm 23. This air is removed through the fluid addition system line 55.

PVC-1 is adjusted to raise the pressure in the upper level 24 of cavity 21 (as indicated by PI-4) to a level higher than the pressure in the lower level 22 of cavity 21 (as indicated by PI-5). FCV-2 is then opened allowing air to flow into 24. This flow displaces diaphragm 23 downward and pushes the air bubbles out line 26 through valve HV-5 to line 55 through valves HV-9/10 to line 54 and out of the fill reservoir.

The rate/speed control of the heart pump 30 includes a potentiometer whereby the frequency or "pulse" of the pump 30 motor can be variably adjusted to achieve the desired flow rate as indicated by FI-1.

The rate/speed control of the respiratory pump 30 includes a potentiometer to control the frequency of the pump 37, and an adjustable mechanical linkage to adjust the stroke (volume) of the pump.

It should be understood that the embodiment of FIGS. 1A, 1B as described above, provides the following analogs for simulating the following features, functions and operations of the human body.

STRUCTURE

Cavities

Cranial "Vb" (b-bulk) (1) of measured dimensions. Supratentorial above diaphragm (8) of measured dimensions. Infratentorial below diaphragm (10).

Ventricles (5) lumped lateral and third as one with subarachnoid paths (4) lumped as two slits carrying fluid.

Pulmonary airway (24).

Vessels

Total Circuit of Measured Radius, Length and Thickness Aorta (32).

Lumped intracranial in flow over paired carotid and paired vertebral arteries in a single port with flow as (33).

Lumped intracranial arteries as single tube (3).
Lumped capillary bed (13) of measured pore size.
Lumped veins proximal to sagittal sinus (19).
Auxiliary flow path to ventricles (5) by (16, 11).
Adjustable return flow from subarachnoid paths over (18).

Sagittal sinus with lumped single check valve (17) for CSF-venous bleed and sagittal sinus veno-venous bleed with lump single check valve (15).

Lumped distal extracranial veins (jugular and facial) as single path for actual paired right and left paths (20).

Central venous pools (22) shunting lumped vena cava return flow blood directly to heart left auricle (30) and left ventricle of the same pump.

Muscles

Myocardium simulated by heart pump (30).
Respiratory muscles including diaphragm, inter-costal and certain anterior neck muscles lumped at pump (37).

Laryngeal muscles valve HV-8 for closing airway in expiratory train.

Valves

Check valve (31) simulates tricuspid valves of heart check valve (29) simulates semilunar valve of right heart but with action of mitral valve of left heart since right auricle and ventricle are by-passed.

Check valve (16) favoring filter flow to ventricle partially similar to Virchow-Robin spaces in CSF path from capillary exchange level as fluid not picked up in veins in the normal exchange between blood and tissue cells

Tissue

Neuro-glia as lumped static fluid volume Vs (2) having origin from arterial flow initially.

Nerves

Lumped bilateral phrenic and intercostal and neck respiratory muscle nerves as a single path from the brain stem to medulla and out as (35) as means of respiratory arrest when cut.

Lumped bilateral vagus as single path (39) from brain stem to medulla as means of heart slowing arrest, when triggered by anoxia.

SIMULATED PROCESSES

Physiological

Fluid

Major, fast, high pressure flow of blood (52) in through flow (3, "Vp1")

Minor, slow, low pressure flow of CSF ("Vp2") in "Vb" (1) in (4) and in (5).

Filter or small intracapillary blood trapped by small capillary paths (13).

Reservoir, Central Venous Pool (22).

Fluid Origin

Major circulating fluid is added by way of fill reservoir (53) simulated by water with ethylene glycol, as a "transfusion".

Minor circulating fluid is fluid flowing from filter.

This simulates only a small fraction of total, most of which is formed at the choroid plexus by filtration and secretion where the vessels are arterioles proximal to capillaries; some may also be formed from ependyma lining ventricles.

Major Circulation

Blood via arteries (3) to filter (13) through check valve (15) to central venous pools (22) and back to heart (30) for recycling in a lumped single circuit similar to that in both the greater or systemic circuit and the lesser or pulmonary circuit having the essential mixed in and out flow to capillary paths that go to all cells in one effective nutrient loop, and a second effective loop to all systems in contact with environment: gut, respiratory muscles kidney, skin, etc.

Minor Circulating

Cerebrospinal fluid (CSF) from filter to ventricles (5) aqueduct of sylvius (6) back through subarachnoid path (4) sagittal sinus (17) to return to major flow path and drain to central venous pools (22).

Major Flow Standing Waves

Arterial peak pressure divided by arterial minimum pressure;

PAsystolic/PAdiasystolic-pressure standing wave ratio (PSWR);

Arterial peak volume velocity divided by minimum volume velocity; and

QAsystolic/QAsystolic-arterial volume velocity ratio (QSWR).

Pulse Properties

Pulse pressure PAsystolic/PAdiastolic in PI-3; and Volume velocity pulse Qsystolic-Qadiastolic in FI-1.

Arterial Pulse Amplitude in Vessels

Palpable in vessels (32) and (33) and visible in (3).

Arterial Pulse Origins

Lumped incident pressures (PA+)+
Lumped reflected pressures (PA−)=PAsystolic
Lumped incident pressures (PA+)−
Lumped reflected pressures (PA−)=PAdiastolic.

Venous Pulse Origins

Sinusoidal variations of "PV" recorded in PI-5 are also visible in elastic diaphragm (23) as they are in prototype veins and CSF pressure records.

Breathing

Air in airway cavity (24) as pulmonary air total air exchange through open valve HV 8 as tidal air straining against closed larynx with closed valve HV-8. Respiratory motion by motor (37) as regulated by (36).

Pathophysiological Conditions

Initial Conditions

Blood Volume (52):
  Hypovolemia reducing circulating fluid volume
  Normovolemia adequate circulating fluid volume
  Hypervolemia excess circulating fluid volume
Tissue Volume (2):
  Atrophy with reduced tissue volume "Vs"
  Normal tissue volume "Vs"
  Excessive tissue volume with swelling of "Vs"

Frequencies

Cardiac (40):
  Bradycardia with slow rate adjustment
  Normal rate of heart beat
  Tachycardia with fast rate adjustment
Respiratory (36):
  Bradypnea with slow adjustment
  Normal respiratory rate
  Tachypnea with fast adjustment

Stroke

Cardiac (40): varying pump rotors
  Low stroke volume
  Normal stroke volume
  High stroke volume
Respiratory (36): with adjustment of cam arm
  Low respiratory excursion
  Normal respiratory excursion
  High respiratory excursion—
    1) Elevation of "PV" to "PA" obstructs "Q" the volume, velocity of circulating fluid;
    2) Recovering of "PV" below "PVO" pumps volume velocity "Q" in proportion to −p=PVO-PV.

Vessel Dimensions (32, 14, 19, 11, 6, 18, 20 & 27)— varying tubing dimensions.
  Narrow paths of stenoses
  Normal paths
  Dilated paths of aneurysms

Valve Action

Aortic regurgitation with removal of check valve (31) causes reduced "PAmax", "QAmax" and pulse amplitude of palpable (32) and visible pulse (3). Mitrosemilunar regurgitation with removal of check valve (29) causes pulse from (30) to appear in central venous pools (22) as though the auriculoventricular flow were right sided, as it is normally with two sided heart. However, the value unit is more like the mitral valve since the pump is two stage but one sided with no pulmonary circulation.

Sagittal sinus valve (17) CSF to venous check preventing reflex of venous blood into CSF.

Sagittal sinus valve (15) preventing reflex of venous blood into intracranial venous system.

Fluid Content

Embolism with air if not removed initially.
Viscosity with variation of fluid (52).

Density with variation of fluid (52).

Osmotic pressure with variation of crystaloids and colloids in (52).

Temperature variations with heat addition or removal in (52).

Non-embolic particles small enough to pass through the filter like blood cells and platelets, may be added to the circulating fluid (52).

Cycles

Pulse in arteries is over three hundred and sixty (360) degrees with dilation compensated by venous compression.

Pulse in venous paths is over three hundred and sixty (360) degrees as inspiration and expiration.

Final Conditions

Tissue Shape

Tumor growth: Tumor (7) volume is defined as "Va". The rate of tumor growth (Va) is the derivative of tumor volume with respect to time (dVa/dt).

$$Va = dVa/dt \quad \text{Rate of Tumor Growth} \quad (1)$$

The volume of CSF within the ventricle (5) and subarachnoid paths (4) is defined as "Vp2". The rate of change of volume of CSF (Vp2) is the derivative of CSF volume with respect to time (dVp2/dt).

$$Vp2 = dVp2/dt \quad \text{Rate of CSF Drainage} \quad (2)$$

Non-damaging deformation occurs when the rate of tumor growth (Va) is less than the maximum rate at which CSF can drain to the venous pools (Vp2max).

$$Va = Vp2max \quad \text{Non-damaging Rate of Tumor Growth} \quad (3)$$

Damaging deformation occurs when the rate of tumor growth (Va) is faster than the maximum rate at which CSF can drain to the venous pools (Vp2max).

$$Va > Vp2max \quad \text{Damaging Rate of Tumor Growth} \quad (4)$$

Tumor Size: Damaging deformation also occurs due to the size of the tumor (Va), even if the damaging rate of deformation does not occur. The initial volume of CSF within the ventricle(s) (5) and subarachnoid paths (4) is defined as "Vp2i".

$$Vp2i = \text{Initial CSF Volume}$$

If the tumor volume (Va) becomes greater than the initial CSF volume (Vp2i), damaging deformation occurs because CSF has drained and Vp2=0 and further, tumor growth, at whatever rate, will cause damage by the same means.

$$Va > Vp2i \text{—Damaging Deformation Due to Excess Tumor Volume}$$

The effects of damaging deformation:

Shifts of non-circulating tissue material (Vs) occurs causing displacement of unit chamber base (12) which simulates a more complicated series of events at the tentorial hiatus. Tissue shift causes direct neural strain or indirect vascular insufficiency from stretch of blood vessels supplying the brain stem. These changes first arrest respiration (37) and then the condition of anoxia cause heart (30) arrest by myocardial nutrient insufficiency.

Tumor: Pressure fed type: —Step inputs of applied pressure p' in tumor as a fast flow may be set at any desired level. That at p'=90 mm Hg with normal pressures of the blood causes rapid bleed of "Vp2" and early arrest of respiration (36) in unit as a result to the damaging pattern of brain deformation outlined under final conditions of tissue shape.

P'=50 mm Hg causes less rapid change with instant oscillating overshoot of "p(t)" in "Vp1" recorded by PI-1. This is nearly PV =PVO+p(t). It then results in fluid addition to the central venous pools (22). This overshoot settles in time "ts" with a few oscillations finally reaching the initial value of PI-1=PVO, as fluid escapes from "Vp2" to (22). This occurs with rate "U2-V/t" calling bleed volume "V".

Repeating the same step input of p' before settling to "PVO" gives an apparent offset of (PI-1).

PA (PI-3) rises almost simultaneously with PI-1 but oscillates to a final value which is a true offset ΔPA remaining. This rises with each successive addition of "Va" with step inputs of p'.

Tumor growth: Slow ramp type accumulations of Va as UI=Va/t also cause rise of PI-1 with a step input of p, is used to start flow but this is adjusted with needle valve (FCV-1) to give a desired rate. This shows fluid shift in more detail over a longer time scale than the pressure fed type which subsides rapidly.

Decreasing bleed rate with FCU-3 adds the action of communicating hydrocephalus as a "tumor" of CSF opening HV-3 venting material (8) like tissue atrophy.

Tumor Removal: This may be fast or slow but more easily controlled with the latter as exact reductions of pressure are attended by proportional reductions of p' and PI-1, which is, in effect, a composite of initial intracranial pressure "PVO" in "Vp2" and any added overshoots and offsets of "p" from load. The symbolism is similar in cerebral venous-CSF pressure (PI-1) as PV for the intracranial flow path but should be distinguished from "PV" measured at PI-5 for the total circulation including both intracranial and extracranial portions.

Rapid removal of applied pressure p' causes proportionally great undershoot of (PI-1) and PA, which may go into a range of vasomotor induced hypotension from one of hypertension measured in PI-3 as "PA". These changes resemble those of prototype brain deformation when peri-dural accumulation is rapidly drained. Their mechanism differs since in the latter's vasomotion is at a distance in systemic vessels. Stimulus at the brain stem cause impulses which pass through paths in the brain and spinal cord before passing out sympathetic fibers forming peripheral vasomotor nerves.

Load

Respiratory

Partial or complete obstruction by increasing overpressure "PVO" (PI-4) in space (24) simulating the gas in respiratory muscles air way by prolonged inspiration or closure of valve HV-8 as a closed larynx. Hyperventilation with prolonged expiration reduces "PV" (PI-5) below "PVO" (PI-4) in this way increasing the pressure drop across the circulation of both blood and CSF. The former contributes to so-called venous pumping of "Q" in through flow, while the latter aids in accommodation of extravascular accumulation by fluid bleed. This may be observed clinically with reduction of pressure "FV" backing up into CSF in ventricles (5) and arachnoid paths (4) or slight brain shrinkage increasing the amplitude of the brain mantle pulse (PI-2).

In addition to the foregoing exemplary embodiment, alternate embodiments have also been considered.

For example, frustration with the empirical investigation of brain deformation, plus the inability to account from loss of brain mantle pulse & variations of cerebral-spinal fluid pressure (CSFP) with preterminal brain compression, plus the expectation that they had a physical basis led the inventor hereof to the analysis of post-traumatic extra-vascular accumulation (EVA) of known volume and duration. This suggested to the inventor a feedback control of circulating fluid volume subsequently elaborated with experimental test of a new model of self-adaptive fluid process control, in which damage to tissue arose after a reversible limit. Reasons are suggested by some previous analog responses, as outlined below.

(1) Analog simulates human (see first Page publication referenced above) and three series of cat brain compression (see second Page publication referred to above). Measurements include bulk volume (Vb) in ml. circulating fluid volume (Vp); non-circulating material (Vs), for water of known density (D) & viscosity $\eta$; input systolic/diastolic pressure (PAs/PAd) and volume velocity (QAs/QAd); output instant [PV(t)]; average (PV) and reference (PVo) pressures recorded with each addition of step inputs of, for example, fifty millimeters of mercury (50 mm Hg) applied pressure from, for example, zero to two hundred and fifty millimeters of mercury (0–250 mm Hg). Induced loss volume (V) generated counter pressure PatApp.

$$PV(t) = PVo + p(t)$$

and continued to seep to reservoir lagging instant rise that settled in time $ts = 4/\omega n.\zeta$ to the reference PVo.

Oscillations of PV(t) occurred with time between peaks $$tpp = 2\pi/\omega d,$$

where $\omega d$ = damped natural frequency.

In this process "V" added a hydrostatic head "p" to the reference pressure to give a total pressure $$PV = PVo + p$$

Corresponding overshoot and offset input pressure were generated as fluid added compressed gas in the reservoir. Removal of applied pressure with equal step removals allowed compressed gas to shift volume "V" back to perfusion paths that restored input and output pressures to initial physiological levels.

Figure 2:
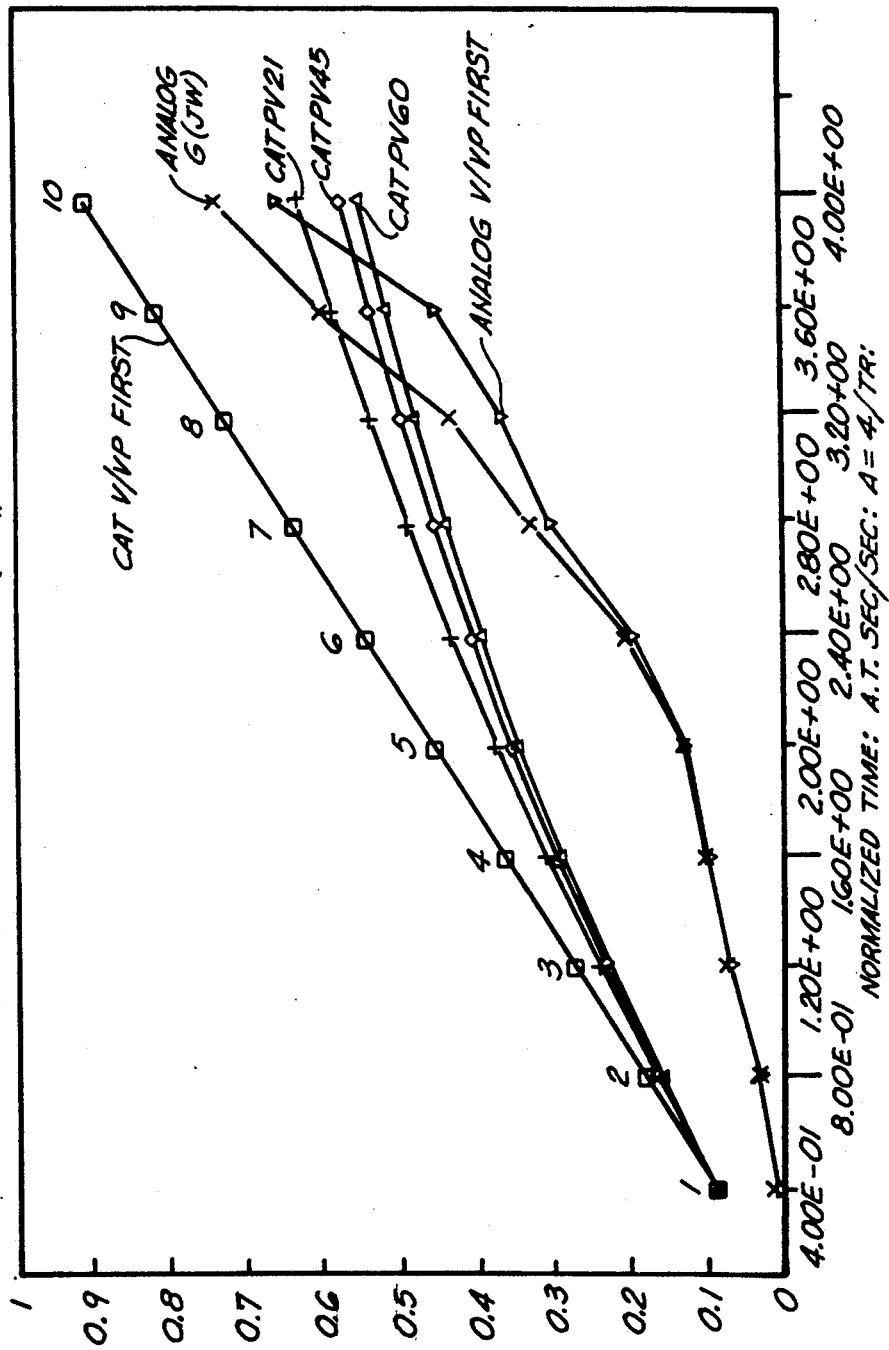
FIG. 2 is a graph of various values developed in the consideration of alternate exemplary embodiments for the invention.

As can be seen in the graph of FIG. 2, for the

X-AXIS: Non-dimensional time a.t where damped natural frequency $a = 4/Tr$ and $t = \Sigma dt$, with preceding total $V = \Sigma dV$; while for the Y-AXIS: Low pass filter $C/R(j\omega) = 1/(1 + TxD)$; $D = 1/t$;

$Tx = RAxCA$ sec;. $RAx = (RAc + K.K1)$ mks Aohms [pascal-sec/m³]. Induced steady state pressure $p = RA.U$ EVA rate "$-$"U' $=$ "$-$"V'/t $= U = dV/dt$. Induced loss of fluid with that prevents rise of the plateau of "PV". Tumor total "V" that lasts time $t = \Sigma dt$ includes preceding increments (dV) lasting "dt". Corresponding ever larger tumor impressed frequencies $\omega = 2\pi/t$, and $d\omega i = 2\pi/dt$. It is noted that volume velocities average resemble the spinal infusion test $$U = V/t;$$

while instant peaks resemble the ventricular test $$U(t) = dV/dt$$

The foregoing led the inventor to the following findings.

Simulation in analog of ever increasing human & cat brain tumor shows three stages: stable, oscillating just prior to the reversible limit followed by removal in the stable range of reversible deformation in which induced outflow reduces overshoots of output pressure.

The data compares low pass filter response $$C/R(j\omega) = 1/(1 + TxD)$$

in a stage preceding oscillations in analog and cat. It is the same as the nominal transfer ratio $$c(t)/r(t) = V/Vp1st,$$

where "Vp" first refers to initial circulating fluid volume which is the normal preceding any EVA.

This leads to the following subject matter comments.

Pulse Damping: Sonic doublet formed by heart stroke and EVA includes normal pulse obliterated before the reversible limit determined by reduced $$Vp2 = Vp1 - V,$$

where the output pressure may be elevated or normal and the tumor momentum is reduced. Arrest of perfusion occurs in the irreversible stage.

Transient Response Modification: As the system is too oscillatory while velocity lag is directly proportional with transient output overshoot; oscillations are reduced by increasing effective fluid resistance as "RAx".

Pathophysiology of High/Low Pressure Hydrocephalus: Obstruction of output paths with hydrocephalus with partial decompression with fluid leak, could lead to low pressure hydrocephalus.

Control: Time varying control $c(t) = V$ of time varying reference $r(t) = Vp$, and first incremental modified reference $e(t) = Vp2n = Vp1 - Vn$. Unit feedback gain $KF = V/(Vp1 - Vp2)$; system gain $K = 1/CA = P-Vo.2\pi/V$ pascal/m⁴, position gain $Kp$ = open loop momentum transfer function $= c(t)/e(t) = Vn/Vp2n$ ml/ml for any tumor $n = 1$. Velocity gain $Kv = U/Vp2$ ml/sec/ml; velocity feedback gain $K1 = (Vp2 + Vp2, /U$ seconds; acceleration gain $Ka = (dU/dt)/Vp2 = (ml-/sec/sec)/ml$. Characteristic resistance $RAc = 2/-(MA/CA)$, where $MA = (PV/U)/j\omega i$ kg/m⁴. $RAx = -RAc + K.K1$ is feedback to input modified error volume $Vp2$, $PV(t)/K$, where effective applied pressure is $PV(t)$ as the low pass filter with period $Tx = RAxCA$ seconds and $D = 1/t$. Transient closed loop momentum transfer operator: $C/R(j\omega) = V/Vp1st = 1/(1 + TxD)$ ml/ml.

The foregoing analyses have led the inventor to the following conclusions concerning brain analog simulates.

1) Ever increasing tumor growth compressing cat brain as a low pass filter for intracranial negative feedback with transient fluid loss;

2) Mechanism of cerebral-spinal fluid (CSF) pressure control is described in analog/cat with differential equation based on counter pressures induced by acceleration, velocity & displacement of CSF; and 3) Counter pressures have equivalent acoustical impedance coefficients for mass "MA" following Lenz, law, resistance "RA" following Ohm's law and capacitance "CA" following Faraday's law adapted to elastic audio wave guides.

These conclusions serve as guidelines in making alternative analog devices.

Particular value is obtained using the propagation of sound in liquids in a complete circuit that is short circuited, with the sound moving through audio wave guides that conserve momentum, energy and mass.

This can be used to provide a closed system that results in a very distinct two port, four pole system as the "AC" side, while the "DC" side has inductance loading added to it with the lumped load causing a lumped output with the main output.

The embodiment(s) described herein in detail for exemplary purposes is of course subject to many different variations in structure, design, application and methodology. Because many varying and different embodiments may be made within the scope of the inventive concept(s) herein taught, and because many modifications may be made in the particular embodiment herein detailed in accordance with the descriptive requirements of the law, it is to be understood that the details herein are to be interpreted as illustrative and not in a limiting sense.

What is claimed is:

1. A "heart" unit serving as a partial analog system of the human body for demonstrating physiological events which occur during the growth of a brain tumor, including cardiac and respiratory failure during rapid tumor growth, comprising:
   an analog of the heart with fluid pumping means for inducing a pulsing flow;
   an analog of the respiratory muscles with means for inducing a secondary pressure pulse;
   an analog of the circulatory system including circulating fluid upon which said analog heart induces a pulsing flow and said respiratory muscles induce a pressure oscillation;
   an analog of the cranial cavity;
   an analog of a brain tumor with supplemental means for displacing a portion of the intracranial cavity; and
   an analog of the cerebral fluid within analog ventricles with means to flow in and out of the cranial cavity via analog subarachnoid paths to equalize cerebral pressure with the circulatory system pressure outside of the cranial cavity.

2. The "heart" unit of claim 1, wherein said means for inducing said pulsing flow on said circulating fluid is a motor driven, peristaltic pump.

3. The "heart" unit of claim 1, wherein said means for inducing said pressure oscillation on said circulation for said respiratory muscles is an electric motor driven, cam actuated, reciprocating, positive displacement pump.

4. The "heart" unit of claim 1, wherein said circulating fluid flows for said circulatory system include analog arteries and veins composed of elastic tubing, with the analog of the capillary system being a variable orifice/filter through which the circulating fluid flows.

5. The "heart" unit of claim 1, wherein said means for displacing a portion of the cranial cavity for said tumor is an inflatable elastic bladder within said cranial cavity.

6. The "heart" unit of claim 1, wherein said ventricles comprise elastic tubing with means for dilating and constricting in response to internal and external pressure imbalance.

7. The "heart" unit of claim 1, wherein said means of equalizing intracranial pressure for said subarachnoid paths with the circulatory systems comprise elastic tubing.

8. The "heart" unit of claim 1, wherein said means of displacing a portion of the cranial cavity for said tumor is effected by the injection of pressurized air into said bladder.

9. The "heart" unit of claim 1, wherein there is further included:
   adjustment means for effectively providing rate of change of tumor displacement within said cranial cavity by injection of said air gas into said tumor by adjusting the amount of the air injection to correspond to various rates of tumor growth and fluid bleed to compensate it in vivo.

10. The "heart" unit of claim 9, wherein said increase of tumor growth results in increased intracranial pressure when sufficient difference exists between growth and bleed rake.

11. The "heart" unit of claim 9, wherein said circulating fluid flows for said circulatory system include analog arteries and veins composed of elastic tubing, with the analog of the capillary system being a variable orifice/filter through which the circulating fluid flows.

12. The "heart" unit of claim 11, wherein said increase of intracranial pressure results in excess pressurization of said ventricles, causing circulating fluid within said ventricles to flow out of said cranial cavity through said subarachnoid paths to a lower circulatory pressure downstream of said orifice/filter.

13. The "heart" unit of claim 12, wherein said flow of ventricular fluid through the subarachnoid paths tends to compensate for the cranial displacement associated with said tumor growth, with the compensation being in the form of a negative feedback system.

14. The "heart" unit of claim 12, wherein said compensatory feedback system is adequate if said ventricular fluid flowing through said subarachnoid paths flows at a rate fast enough to relieve said intracranial pressure, and, when said tumor rate of growth is too rapid, intracranial pressure continues to rise to that point where a limit switch is activated which turns off said analog respiratory muscles, providing an analog of said respiratory failure, and, if said intracranial pressure continues to rise, a second limit switch is activated turning off the "heart" unit, providing an analog of said cardiac failure, thus simulating the lethal effect of axial brain stem shift and concurrent trans-tentorial herniation.

15. The "heart" unit of claim 14, wherein said respiratory and cardiac functions are restorable by the opening of a valve which vents said air within said tumor to atmosphere, reducing said tumor's displacement, the venting of said tumor being analogous to the tumor's surgical removal.

16. The "heart" unit of claim 15, wherein the venting of the air reduces tumor displacement, allowing said circulating fluid to flow back into said ventricles, restoring said analog system to initial conditions.

17. The "heart" unit of claim 1, wherein the "heart" unit is used as a teaching aid for medical students for displaying the patho-physiological effects of tumor growth.

* * * * *